United States Patent
Shavit (10) Patent No.: US 11,253,992 B2
(45) Date of Patent: Feb. 22, 2022

(54) METHODS AND APPARATUSES FOR EXOSKELETON ATTACHMENT

(71) Applicant: ReWalk Robotics LTD., Yokneam (IL)

(72) Inventor: Avihay Shavit, Bat Heffer (IL)

(73) Assignee: REWALK ROBOTICS LTD., Yokneam (IL)

(*) Notice: Subject to any disclaimer, the term of this patent is extended or adjusted under 35 U.S.C. 154(b) by 385 days.

(21) Appl. No.: 15/742,396

(22) PCT Filed: Jul. 6, 2016

(86) PCT No.: PCT/IL2016/050723
§ 371 (c)(1),
(2) Date: Jan. 5, 2018

(87) PCT Pub. No.: WO2017/006322
PCT Pub. Date: Jan. 12, 2017

(65) Prior Publication Data
US 2018/0257216 A1    Sep. 13, 2018

Related U.S. Application Data (60) Provisional application No. 62/189,148, filed on Jul. 6, 2015.

(51) Int. Cl.
*A61H 3/00* (2006.01)
*B25J 9/00* (2006.01)
*A61H 1/02* (2006.01)

(52) U.S. Cl.
CPC .......... *B25J 9/0006* (2013.01); *A61H 1/0255* (2013.01); *A61H 1/0262* (2013.01);
(Continued)

(58) Field of Classification Search
CPC ....................................................... A61H 3/00
See application file for complete search history.

(56) References Cited

U.S. PATENT DOCUMENTS 3,707,963 A    1/1973 Keropian
5,665,058 A    9/1997 Young
(Continued)

FOREIGN PATENT DOCUMENTS

EP         1 792 597      6/2007
WO      2014093470 A1    6/2014
(Continued)

OTHER PUBLICATIONS

Internatioanl Search Report and Written Opinion for International Application No. PCT/IL2016/050723, dated Dec. 27, 2016.
(Continued)

*Primary Examiner* — Jacqueline Woznicki
(74) *Attorney, Agent, or Firm* — Cooley LLP (57) ABSTRACT

In some embodiments, an exoskeleton device for providing gait/movement assistance to users, and more particularly, methods and apparatuses for attaching such devices to a limb of the users, are presented. In some embodiments, the apparatus may comprise a support, a support holder, and a retaining element for retaining the support secured to the support holder at least when the apparatus is in use. In some embodiments, the attachment of the support to the support holder may be configured so as to allow the support a range of translational and/or rotational degrees of motion.

8 Claims, 8 Drawing Sheets

(52) U.S. Cl.
CPC ......... *A61H 3/00* (2013.01); *A61H 2003/007* (2013.01); *A61H 2201/1207* (2013.01); *A61H 2201/149* (2013.01); *A61H 2201/164* (2013.01); *A61H 2201/165* (2013.01); *A61H 2201/1623* (2013.01); *A61H 2201/1628* (2013.01); *A61H 2201/1642* (2013.01); *A61H 2201/1645* (2013.01); *A61H 2201/1652* (2013.01); *A61H 2201/1676* (2013.01); *A61H 2201/5007* (2013.01); *A61H 2201/5058* (2013.01); *A61H 2201/5061* (2013.01); *A61H 2201/5069* (2013.01); *A61H 2201/5084* (2013.01)

(56) References Cited

U.S. PATENT DOCUMENTS

| | | |
|---|---|---|
| 7,153,242 B2 | 12/2006 | Goffer |
| 8,905,955 B2 | 12/2014 | Goffer |
| 9,808,073 B1* | 11/2017 | Maxwell ................. B25J 9/0006 |
| 2003/0115954 A1 | 6/2003 | Zemlyakov et al. |
| 2012/0101415 A1 | 4/2012 | Goffer |
| 2013/0253385 A1 | 9/2013 | Goffer |
| 2014/0005577 A1 | 1/2014 | Goffer |
| 2014/0174453 A1 | 6/2014 | Panzica |
| 2014/0196757 A1 | 7/2014 | Goffer |
| 2019/0350794 A1* | 11/2019 | Angold ..................... A45F 3/08 |

FOREIGN PATENT DOCUMENTS

| | | |
|---|---|---|
| WO | WO 2014/092162 | 6/2014 |
| WO | 2015095211 A2 | 6/2015 |

OTHER PUBLICATIONS

Extended European Search Report dated Apr. 1, 2019, for European Application No. 16820956.7, 7 pages.

* cited by examiner

METHODS AND APPARATUSES FOR EXOSKELETON ATTACHMENT

CROSS-REFERENCE TO RELATED APPLICATIONS

This application is a 35 U.S.C. § 371 national stage entry of PCT/IL2016/050723, entitled "Methods and Apparatuses for Exoskeleton Attachment," and filed Jul. 6, 2016, which in turn claims priority to U.S. Provisional Patent Application No. 62/189,148, filed Jul. 6, 2015, and entitled "Methods and Apparatuses for Exoskeleton Attachment." The disclosure of each of the above applications is incorporated herein by reference in its entirety.

FIELD OF THE DISCLOSURE

Embodiments of the current disclosure are directed toward exoskeletons for providing gait/movement assistance, and more particularly, methods and apparatus for attaching such devices to a body.

BACKGROUND

Various conditions contribute to the occurrence of disabilities in individuals that restrict or eliminate the individuals' capabilities for steady gait and/or movement, examples of which include neurological and physical injuries. Exoskeletons ("external skeletons") have been used to allow such individuals regain some or all of their capabilities to stand and/or move about with little or no additional support despite their disabilities.

SUMMARY OF SOME OF THE EMBODIMENTS

Embodiments of the methods and apparatus for attaching exoskeleton devices to a body include a harness apparatus for attaching an exoskeleton device to a limb. In some embodiments, the harness apparatus may comprise a limb support, a support locking element, a support holder configured to define a space for receiving and securing the support locking element at least partially within the space, a connection element configured for connection to the exoskeleton device; and an articulation member configured to articulate with the connection element. Further, in some embodiments, the apparatus may include a retaining element configured to retain the support locking element at least partially within the space. In some embodiments, at least a portion of the limb support can include a curved portion configured to correspond to a curvature of a limb when adjacent the limb. In addition, the support locking element may include a tubular body with a hollow core configured to receive a retaining element for securing the limb support to the support holder.

In some embodiments, the space is bounded by a loop shaped and sized to receive the support locking element within the space, and the loop may be configured to allow the support locking element to traverse reversibly along an axis of the bounded space. Further, the loop may be configured to allow the support locking element to rotate about an axis of the bounded space.

In some embodiments, the established articulation allows rotation of the harness about an axis substantially parallel to a length of a leg of the exoskeleton device. The articulation member may include a hole, and articulation may be established with at least one of a screw, bolt, and stud traversing the hole and securing the support holder to the connection element. In some embodiments, the connection element may include a bore and the articulation member may include a projection configured for insertion into the bore so as to establish secure attachment with the connection element. In some embodiments, at least one of the limb support, the support locking element, the support holder, the connection element are configured for connection to the exoskeleton device, and the articulation member may be adjustable such that the apparatus can accommodate a plurality of limb shapes and/or sizes.

In some embodiments, a harness apparatus for attaching an exoskeleton device to a limb is disclosed. The harness may comprise a support holder including a first end and a second end, the first end and the second end defining a support holder axis therebetween; a limb support coupled to a support lock element, the limb support configured to rotate about the support holder axis; and a connection element configured to pivotably connect to the support holder along a common axis of rotation. In some embodiments, the support lock element is configured to reversibly slide along the support holder axis so as to shift a position of the limb support. In some embodiments, the apparatus further comprises a retaining element extending along the support holder axis, the retaining element providing an anchor for the reversible sliding of the support lock element along the support holder axis.

In some embodiments, at least a portion of the limb support includes a curved portion configured to correspond to a curvature of a limb when adjacent the limb. In some embodiments, at least a portion of the limb support includes a curved portion and a curvature of the limb support curved portion is in the range from about 30 degrees to about 180 degrees. Further, the limb support is malleable to adapt a shape of a limb when placed adjacent to the limb.

In some embodiments, the support lock element includes a tubular body with a hollow core configured to receive a retaining element for securing the limb support to the support holder. The support holder further includes at least partial loop shaped and sized to receive the support lock element within a space defined by the at least partial loop. In addition, the apparatus further includes an articulation member for establishing the connection between the connection element and the support holder, wherein the articulation member includes a projection on one of the connection element and the support holder and a recess for receiving the projection on the other of the connection element and the support holder, and wherein the articulation member includes a recess on one of the connection element and the support holder and the connection between the connection element and the support holder is established with at least one of a screw, bolt, and stud traversing the recess and securing the support holder to the connection element.

In some embodiments, the apparatus further includes a fastener for controlling a rotation of the connection element and/or the support holder about the common axis of rotation. In some embodiments, the support lock element includes a hollow conduit configured to receive a retaining element running between the first end and the second end so as to lock the support lock element to the support holder. In some embodiments, the apparatus further includes padding to at least a surface of the limb support configured to face a limb when the limb support is worn by a user.

In some embodiments, the connection element of the apparatus is further configured to establish a connection with an exoskeleton device, wherein the connection established between the connection element and the exoskeleton device allows for translation of the connection element about the connection with the exoskeleton device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION OF SOME OF THE EMBODIMENTS

In some embodiments of the present disclosure, an exoskeleton device for providing gait/movement assistance, and more particularly, methods and apparatuses for attaching such devices to a body are presented. Although amenable to various applications, specific embodiments are described herein, by way of example and not limitation, in order to illustrate the principles and features of the invention.

Figure 1:
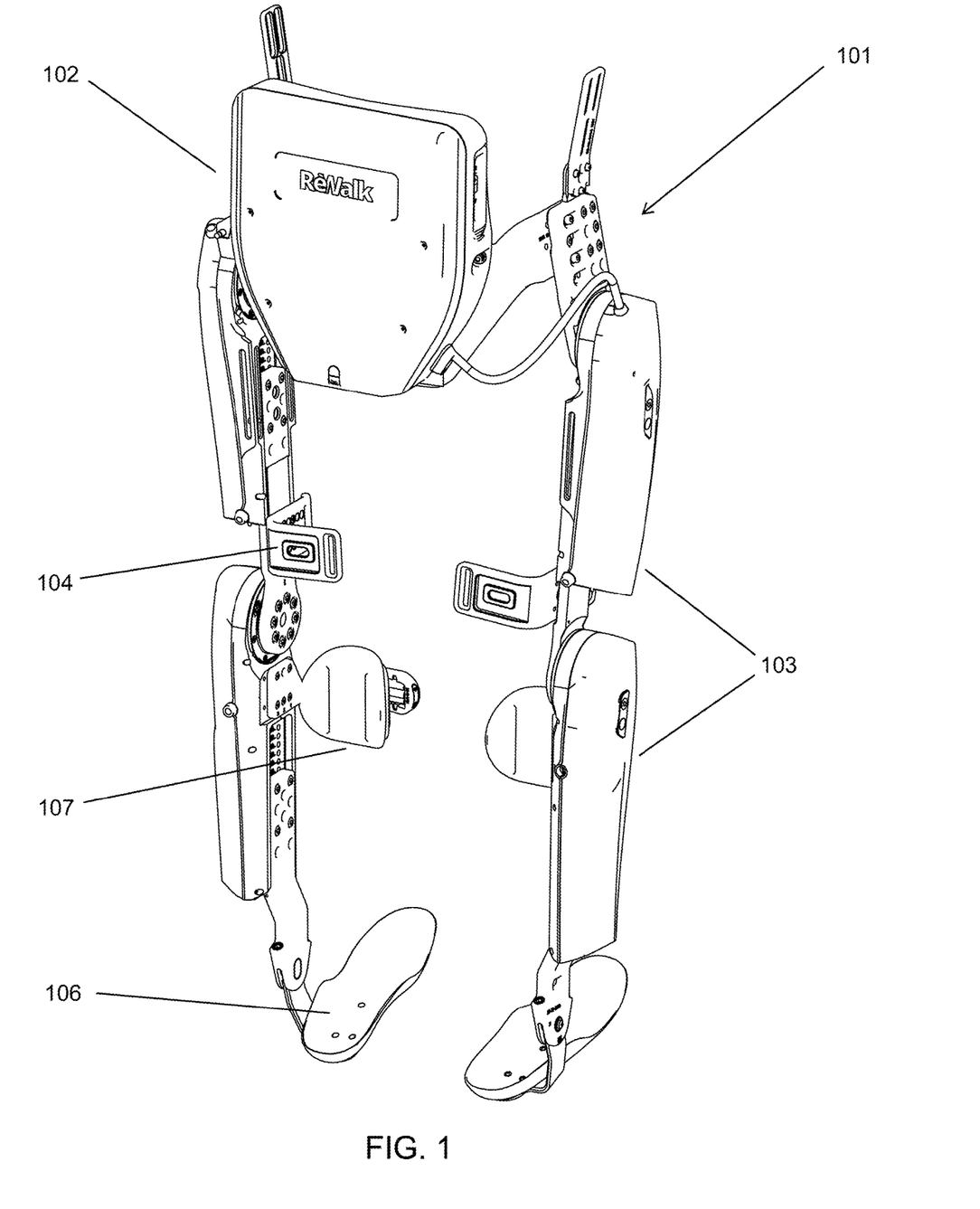
FIG. 1 shows an exoskeleton device for providing gait/movement assistance to individuals with disabilities, according to some embodiments.

With reference to FIG. 1, in some embodiments, a lower-limb exoskeleton device 101 designed for humans is shown. The exoskeleton device 101 can be powered and controlled by controller pack 102, which may incorporate a controller (e.g., in the form of a programmable processor), a memory, a communications component, a power source (e.g., battery), and/or the like. In some cases, the controller pack 102 can be worn on the back of a person using the exoskeleton device 101. Alternatively, the various components of the controller pack 102 may be attached to or incorporated in various components of the exoskeleton device 101. For example, components of controller pack 102 can be incorporated into braces 103. In some embodiments, the controller pack 102 or components thereof may be external to the exoskeleton device 101, and instructions for the operation of the exoskeleton device 101 may be sent wirelessly to the exoskeleton device 101 (e.g., to a communications component onboard the exoskeleton device 101).

Controller pack 102 may communicate with sensors (e.g., a tilt sensor) affixed to a location on the upper portion of the user's body that provide the controller pack 102 with information related to the gait and movement of the user, the exoskeleton device 101, etc. Such information may include, for example, the tilt of the user with respect to some axis (e.g., the tilt sensor may provide the controller pack 102 the degree of tilt of the torso, and/or the orientation of the tilt). An example of a location for the tilt sensor can be a shoulder strap that holds controller pack 102 to the user's torso. In some embodiments, the tilt sensors may include accelerometers, gyroscopes, and/or any other sensors capable of being incorporated in or externally connected to an exoskeleton device 101 so as to provide information on the tilt of the user. For example, the tilt sensors may generate signals that indicate whether the user's upper portion of the body is leaning or is upright with respect to a vertical axis. Another example of a sensor that may communicate with the controller pack 102 includes a power sensor (e.g., a battery level sensor).

In some embodiments, the exoskeleton device 101 may be affixed by means of straps 104 to locations on the user's body, locations such as but not limited to lower limbs, pelvis, torso, and/or the like. For example, braces 103 of the exoskeleton device 101 may be attached to the user's body via said straps 104. In some embodiments, braces 103 may incorporate motorized actuation assemblies, each of which may include motorized actuators that, in response to commands transmitted by controller pack 102 can, for example, cause a joint that connects individual braces 103 to bend or extend. Bending or extending a joint may propel or move a limb to which an adjoining brace is attached, thereby assisting in the movement of users of exoskeleton devices 101. When the lower limbs of the user are affixed to braces 103, each of the user's feet can be placed on a foot brace 106, which may be movable (for example, by means of a same or separate motorized actuation assembly) to lift, guide, lower, etc., a foot of the user. Alternatively, foot brace 106 may include a coil, spring, and/or other elastic anti-drop mechanism associated with ankle joints. The anti-drop mechanism can be designed to hold foot brace 106 at least substantially horizontal when foot brace 106 is raised and is not supported by a supporting surface. Various aspects of the exoskeleton device have been described in the following US publications, all of which are incorporated by reference herein in their entireties:

U.S. Pat. No. 7,153,242, issued Dec. 26, 2006, filed May 24, 2001, and entitled "Gait-locomotor apparatus;"

U.S. Pat. No. 8,905,955, issued Dec. 9, 2014, filed Jan. 7, 2013, and entitled "Locomotion assisting device and method;"

US Patent Publication No. 2012/0101415, published Apr. 26, 2012, filed Oct. 21, 2010, and entitled "LOCOMOTION ASSISTING APPARATUS WITH INTEGRATED TILT SENSOR;"

US Patent Publication No. 2013/0253385, published Sep. 26, 2013, filed Mar. 21, 2012, and entitled "MOTORIZED EXOSKELETON UNIT;"

US Patent Publication No. 2014/0005577, published Jan. 2, 2014, filed Jun. 28, 2012, and entitled "AIRBAG FOR EXOSKELETON DEVICE;" and US Patent Publication No. 2014/0196757, published Jul. 17, 2014, filed Jan. 17, 2013, and entitled "GAIT DEVICE WITH A CRUTCH."

Figure 2A:
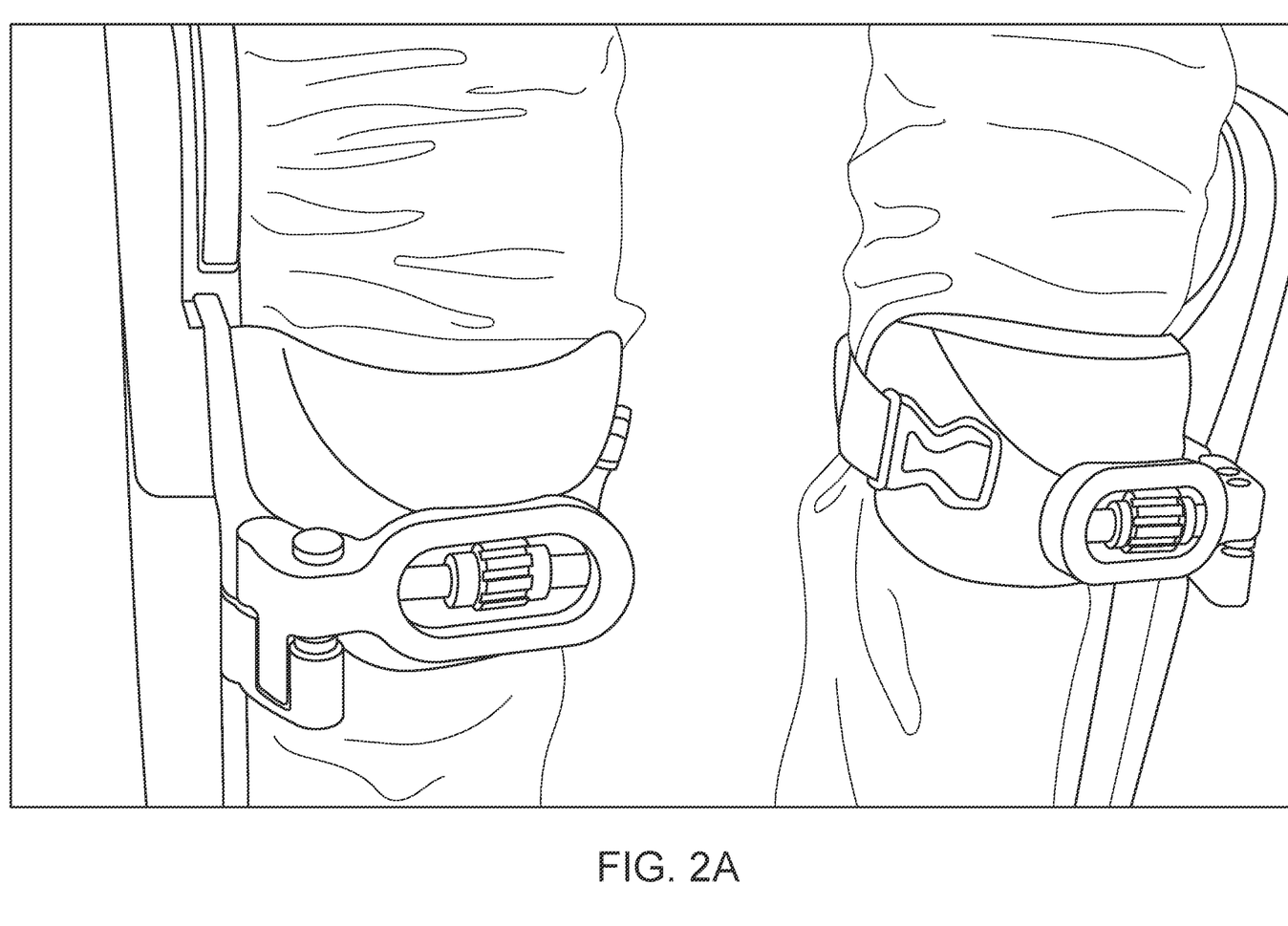
FIGS. 2A-B illustrate a harness installed on an exoskeleton device being used for attaching limbs to an exoskeleton device (FIG. 2A) and when not in use (FIG. 2B), according to some embodiments.
Figure 3:
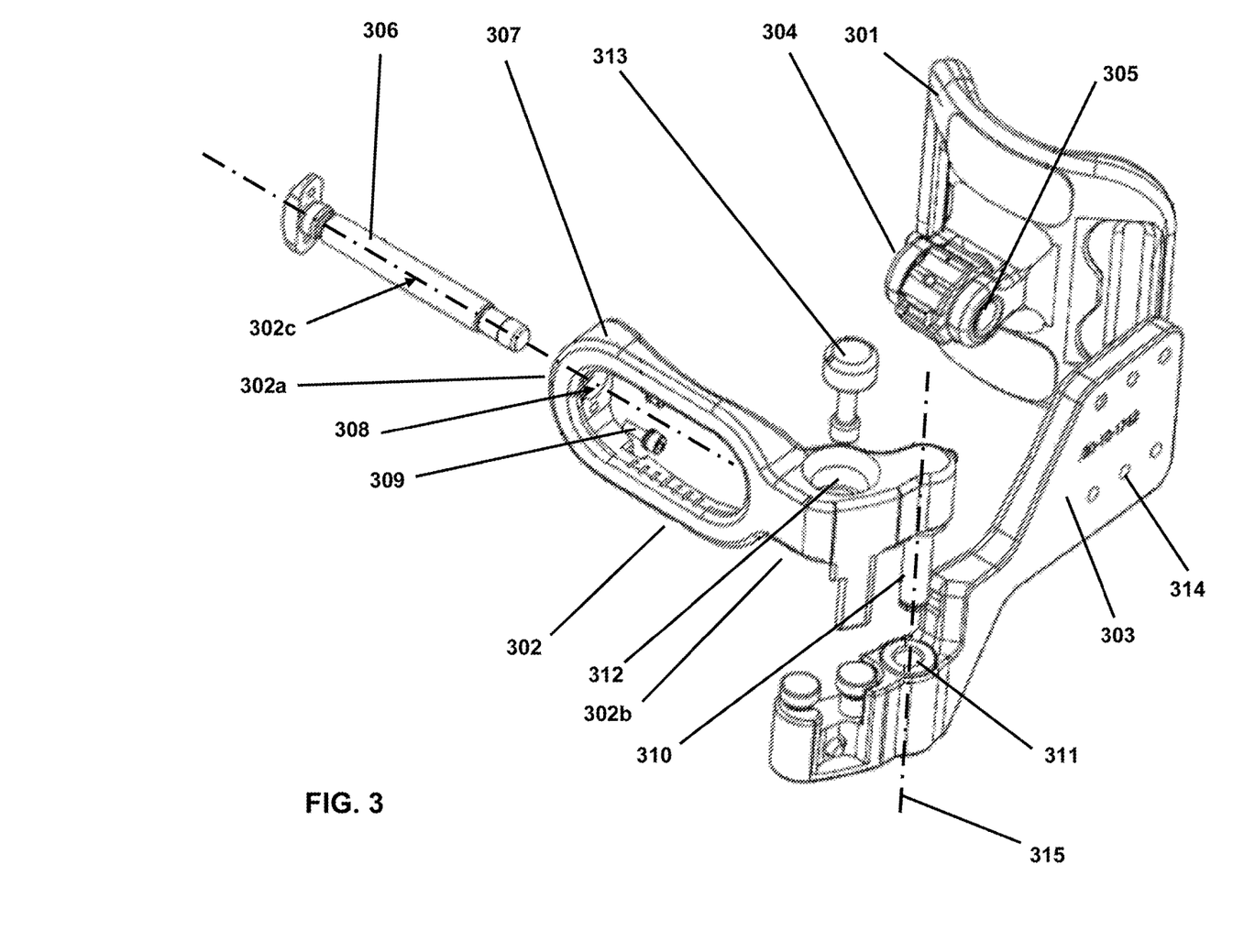
FIG. 3 shows an example exploded view of the harness disclosed herein, according to some embodiments.

In some embodiments, the exoskeleton device 101 can also be attached to a user's body via a harness 107. The harness 107 can be installed at one or both legs of the exoskeleton device 101, and can be designed to provide support and/or attachment to a limb (e.g., leg) of the user at any point along the leg. For example, the harness 107 can provide such support and/or attachment below the joint connecting the upper and lower braces 103 (i.e., beneath the knee of the user), e.g., FIG. 2A. In some embodiments, the harness 107 may include a limb support 301 for abutting the leg of a user, a support holder 302 for locking the support (e.g., when the harness 107 is in use), and a harness strap 201 for securing the harness to the leg of a user of an exoskeleton device 101. In some embodiments, a connection element 303 can be used to connect the harness 107 to the exoskeleton device 101. The connection element 303 can be a structure independent of both the harness and the exoskeleton device 101, or it may be part of the harness 107 and/or the exoskeleton device 101.

Figure 2B:
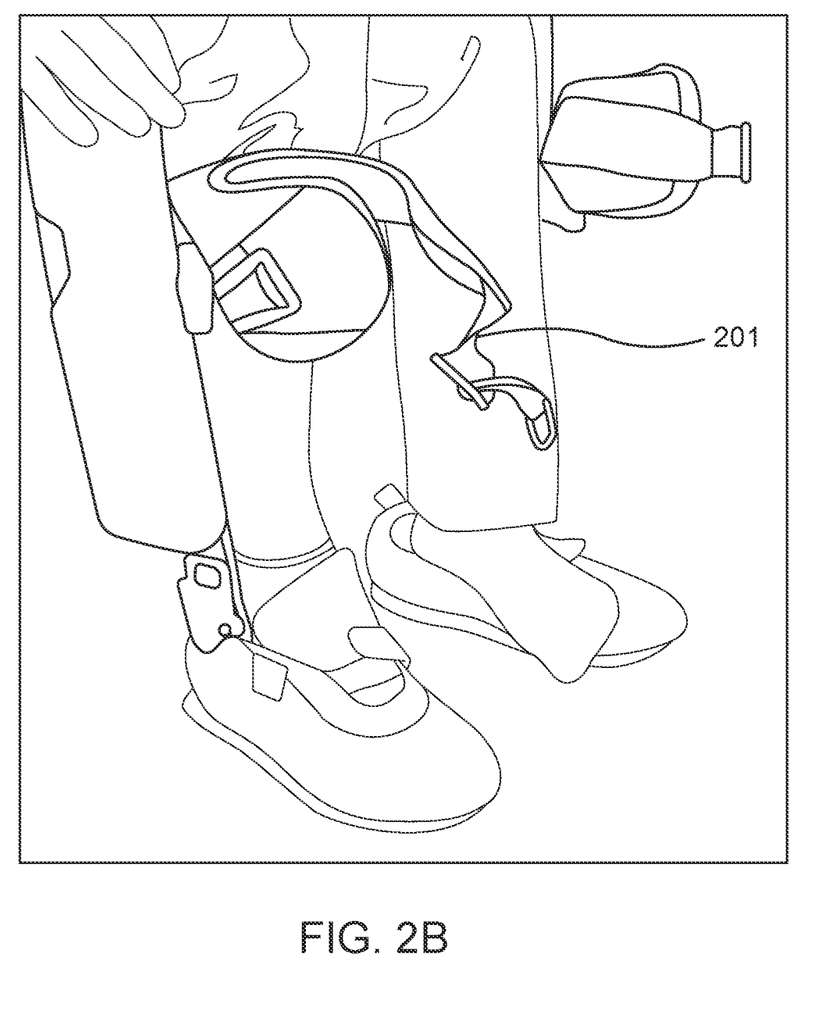

In some embodiments, the limb support 301 may be curved so as to substantially following (i.e., closely following or mimicking) the curvature of a limb of a user when the support abuts the limb. For example, when in use, the limb support 301 may extend partially or fully around the leg of a user at beneath the knee, e.g., FIG. 2A. In other words, the limb support 301 may include an arc with a degree of curvature extending from about 10 degrees to about 360 degrees, from about 20 degrees to about 180 degrees, from about 30 degrees to about 90 degrees, from about 30 degrees to about 60 degrees, about 45 degrees, etc., along a circumference of a circle defined by a diameter ranging from about 2 inches to about 6 inches, from about 3 inches to about 4 inches, about 4 inches, etc. As such, the width of the limb support 301 can be sized to range from a minimal width capable of providing support to a leg when in use (e.g., as narrow as about 1% the width of the leg) to a width capable of at least substantially encircling a human leg at any point along the leg. In some embodiments, the length of the limb support 301 can also be sized to range from a minimal length capable of providing support to a leg when in use (e.g., as narrow as about 0.1% the length of the upper or lower brace 103 of the exoskeleton device 101 to which the harness 107 comprising the support is connected) to a length substantially equal to the length of the upper or lower brace 103. For example, the limb support 301 can have a length ranging from about 2 inches to about 6 inches, from about 3 inches to about 5 inches, about 4 inches, etc. In some embodiments, the curvature of a limb support 301 can run the gamut from being at least substantially flat to assuming a "U-shape" capable of embracing a limb. In some embodiments, the limb support 301 can be constructed to include different sections that have different curvatures. For example, the section of the limb support 301 that faces the front or back of a human leg may be curved to substantially fit the shape of the leg at that location, while the section of the limb support 301 that faces the sides of the leg may be at least almost flat. In some embodiments, the limb support 301 may be malleable; that is, the limb support 301 may be made from a flexible enough material that allows the shape of the limb support 301 to be adjusted dynamically (e.g., when in use as needed). In some embodiments, the limb support 301 may be padded to increase the comfort of the user of the exoskeleton device 101 wearing the harness 107 for attachment and support, e.g. FIG. 2B. Incidentally, the padding may also increase the sturdiness of the support.

In some embodiments, the limb support 301 may include a support lock element 304 configured to establish connection with the support holder 302 of the harness 107. For example, the support lock element 304 can be an extension located on a surface of the support that is opposite to the surface or side that directly abuts a leg of a user. In some embodiments, the support lock element 304 can be integrally connected to (i.e., a monolithical part of) the support. In some embodiments, the support lock element 304 can comprise a hollow tubular body or a ring designed to receive a retaining element 306 through the ring or the hollow space 305 to secure or retain the support 301 to the support holder 302. In some embodiments, the support lock element 304 can be one of a "hook" or an "eye" in a hook-and-eye closure type of locking mechanism. For example, the support lock element 304 may comprise an eyelet configured to receive a fastener (that may be part of the support holder or external to it, for example) to establish a secure connection to the support holder 302. In some embodiments, the support lock element 304 may comprise magnetic material that allows the lock element (and by extension the support) to establish a magnetic connection to the support holder 302. In some embodiments, the support lock element 304 and the support holder 302 may comprise a drill and pin mechanism configured to keep the support lock element 304 and the support holder 302 in a substantially constant lateral relative position to each other.

In some embodiments, the support holder 302 may be a structure designed to be complementary to the support lock element 304 to establish a secure connection to the support 301. For example, when the lock element 304 comprises a hollow tubular body with a hollow space 305, the support holder 302 may comprise a loop 307 of suitable size and shape to accommodate the support lock element 304 in the space enclosed or defined by the loop 307. In some embodiments, the loop 307 can have a curved shape (e.g., running parallel to the limb support 301). The support lock element 304 may be oriented in the enclosed or defined space so as to align a hollow space 305 of the lock element 304 (e.g., the hollow space of the above-mentioned tubular body, the space enclosed by the above-mentioned ring, etc.) to an opening 308 on the surface of the loop shaped and sized to allow a retaining element 306 (e.g., pitch axis) pass through and securely associate or retain the support holder 302 to the lock element 304 (and by extension to the support 301). For example, the support lock element 304 may be held in place by the retaining element 306 in the space defined by the support holder loop 307. In some embodiments, the retaining element 306 may further be connected to the support holder 302 by other fastening components 309 such as screws, bolts, studs, nuts, and/or the like. In some embodiments, the support holder 302 may comprise two ends (a first end 302a and a second end 302b) defining a support holder axis 302c therebetween along which the hollow space 305 of the lock element 304 may be aligned with so as to allow the retaining element 306 pass through and securely associate or retain the support holder 302 to the lock element 304.

In some embodiments, the support holder 302 may comprise articulation members 310 configured to establish a secure connection with the connection element 303 used to connect the harness 107 to the exoskeleton device 101. The articulation members 310 can be in the form of projections for insertion into a hollow space or a bore or a conduit 311 on the connection element 303. In some embodiments, the articulation members 310 can be configured to be positioned (e.g., inserted) within a hollow space or a bore or conduit 311 in the connection element 303, wherein a retaining element (not shown) can be used to secure the positioning of the articulation members 310 within the hollow space or bore or conduit 311 (e.g., keeping the articulation members 310 in place to prevent the support holder 302 from being pulled out of the connection element 303). In some of these embodiments, the secure connection between the support holder 302 and the connection element 303 allows the support holder 302 and/or the harness (which may comprise at least the limb support 301 and the support holder 302, for example) a rotational degree of freedom about an axis 315 substantially parallel to the legs of the exoskeleton device 101 when the harness is in use to support and attach a limb to an exoskeleton device 101. For example, as shown in FIG. 3, the support holder 302 may comprise articular members 310 (with respect to axis 315, for example) that may be positioned within (e.g., slipped into) the hollow space or bore or conduit 311 along the height of the connection element and form a secure connection thereof. However, this connection can allow rotational freedom to one or more of the support holder 302, the harness to which the support holder 302 belongs to and the connection element 303 about the axis 315. This rotational freedom is convenient for users of the exoskeleton device 101 as it allows them to position their limbs with ease when engaging the harness. In some embodiments, this rotational movement may be controlled via a fastener 313 (e.g., pin) configured to allow the limb support 301 to assume a plurality of positions. For example, the fastener 313 may be a pin preloaded by a spring, having 2 optional positions: opened or closed. Once the leg of the user is in position to receive the harness 107, the limb support 301 can be rotated to its desired position, abutting a limb of the user. In some embodiments, placing the fastener 313 in one of the two positions (e.g., open), allows the rotation to take place. For example, pressing the pin may allow the rotational movement, whereas dismissing it may prevent the limb support 301 from reverting back, thereby allowing the limb support 301 to form a rigid anterior support aligning the limb with the exoskeleton device 101 without much play.

In some embodiments, the connection element 303 may include articulation members that are configured to fit complementarily to those on the support holder 302 and establish a secure connection between the connection element 303 and the support holder 302 as described above. For example, if the articulation element of the support holder 302 comprises an articulation member (which may also be referred to as a projection) 310, the connection element may comprise a bore or conduit 311 running along its length for receiving the projection and establishing an articulation or a joint. As another example, both the support holder 302 and the connection element 303 may comprise openings through which a fastener 313 may pass into a position which prevents further relative movement between the support holder 302 and the connection element 303 making them rigidly or semi-rigidly connected. In some embodiments, as discussed above, the articulation between the support holder 302 and the connection element 303 may allow a rotational degree of freedom wherein the harness/support holder 302 may rotate about an axis 315 that is substantially parallel to the length of the braces/legs of the exoskeleton device 101. In some embodiments, the support 301 may not be directly secured to or contacted to the connection element 303 or the exoskeleton device 101, and its connection to these components may come through the support holder 302.

In some embodiments, the connection element 303 may comprise exoskeleton device engagement elements 314 of suitable size and shape configured to attach the connection element 303 to the exoskeleton device 101. In some embodiments, the engagement elements 314 may be holes in the connection element 303 shaped and sized to allow screws to secure the connection element 303 to the exoskeleton device 101 (e.g., to the braces 103 of the exoskeleton device 101). In some embodiments, a set of threads in the exoskeleton device 101, allows the positioning of the connection elements 303 in various anterior/posterior locations, thus facilitating the harness 107 to fit different limb diameters and mild knee extension limit issues (e.g., users that are unable to stand completely straight). In some embodiments, the engagement elements 314 may be projections that lock into receiving recesses in the braces/legs of exoskeleton device 101 to attach the connection element to the exoskeleton device 101. In some embodiments, the attachments or connections between the connection element and the exoskeleton device 101 are designed so as to allow the connection element 303 (and hence the harness to which it is securely attached) a translational degree of freedom to move longitudinally along the length of the legs of the exoskeleton device 101 (e.g., in a direction substantially parallel to the axis 315). That is, in some embodiments, the harness can be contacted to the exoskeleton device 101 via the connection element 303 in a way that permits a user of the exoskeleton device 101 to slide the harness up and down along the legs of the exoskeleton device 101. This, for example, may allow a user of the exoskeleton device 101 to situate the harness at a desired point along a limb of the user, thereby enhancing the user's comfort and the efficacy of the harness in providing to the limbs of the user support and attachment to the exoskeleton device 101.

Figure 4A:
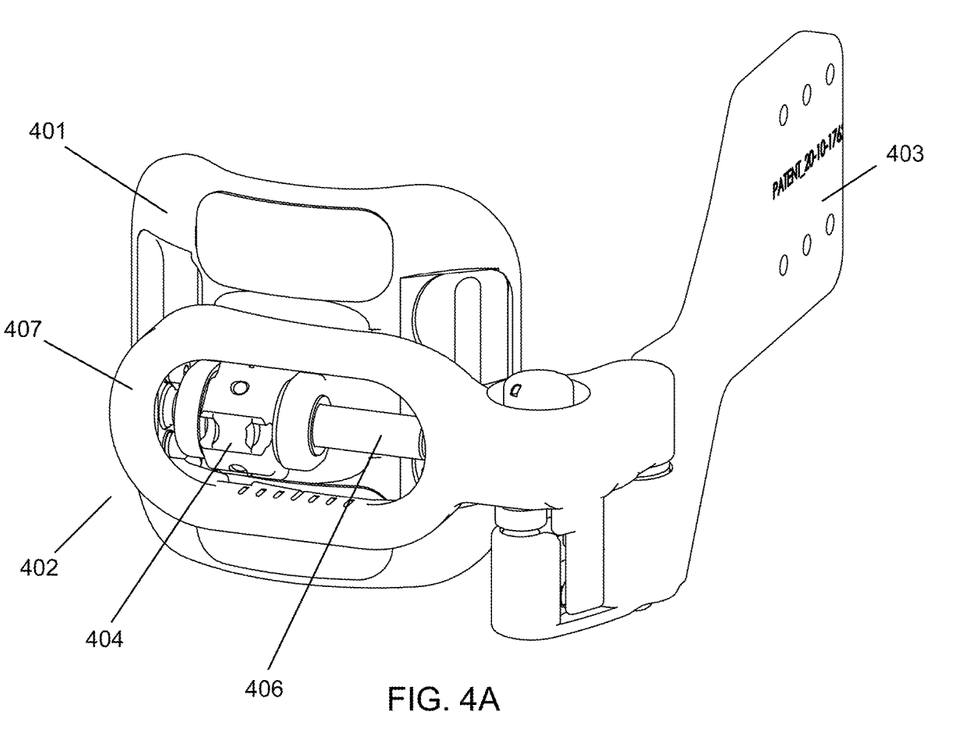
FIGS. 4A-B illustrate the translational degree of freedom of a support of the harness as it moves from one end (FIG. 4A) to another end (FIG. 4B) when attached to a support holder, according to some embodiments.
Figure 4B:
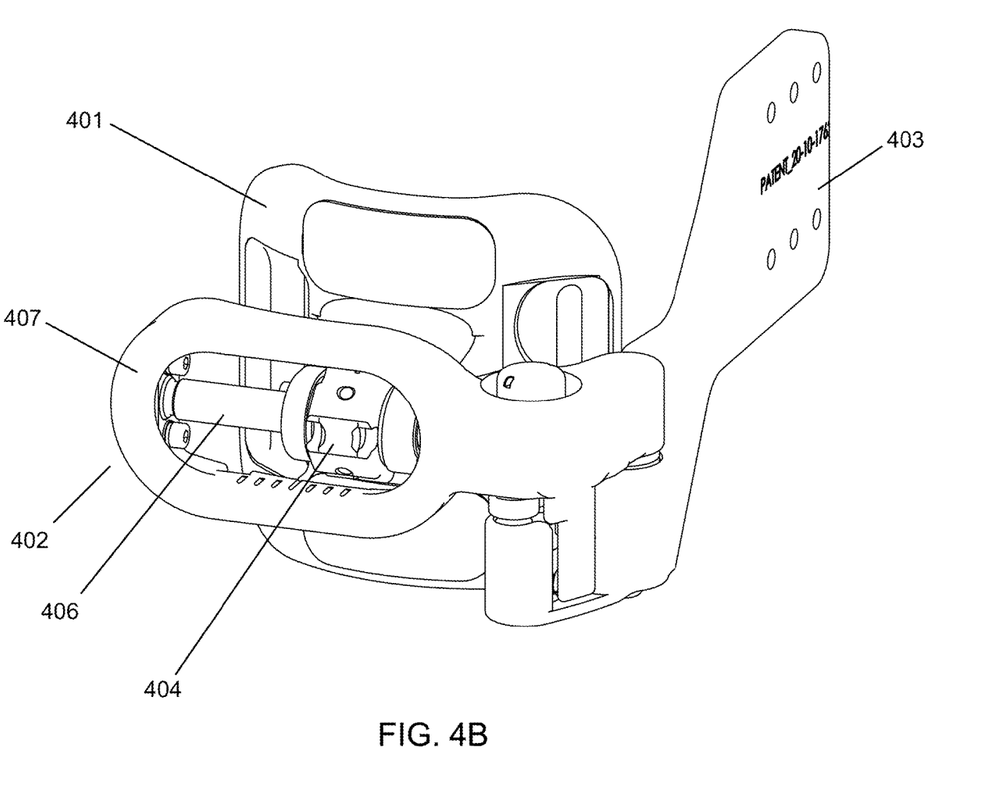

In some embodiments, with reference to FIG. 4, the space enclosed or defined by the loop 407 of the support holder 402 may be of suitable shape and size to allow a support lock element 404 secured by a retaining element 406 to the support holder 402 to move longitudinally along the length of the retaining element 406 in the space enclosed or defined by the loop 407. For example, the loop 407 may have a substantially oval or elliptical shape, and a retaining element 406 entering through an opening (not shown) on the surface of the loop 407 may be oriented substantially parallel to the major axis of the elliptical loop and pass through the hollow space of the support lock element 404 to place the support lock element 404 in the space defined by the loop (e.g., FIGS. 4A-B). In some embodiments, the retaining element 406 may be elongated and may have a length greater than the width of the support lock element 404 along the direction of the hollow space. Such embodiments provide the support lock element 404 the freedom to move longitudinally in either direction along the major axis of the loop 407 (which may substantially correspond to the direction of the length of the retaining element 406, in some embodiments) by sliding along the retaining element 406. As the support lock element 404 may be securely connected to the limb support 401, the movement of the support lock element 404 along the axis may allow the limb support 401 (and consequently the harness of which it is a part of) substantially the same range of motion along same axis. For example, the motion of the support lock element 404 and/or the limb support 401 can range from one end of the retaining element 406 (e.g., FIG. 4A) to another end (e.g., FIG. 4B). This can be beneficial for users of the exoskeleton device 101 as it facilitates the adjustment of the limb support 401 in medial-lateral manner, so as to best fit various limb diameters, shapes and deformations which call for different medial-lateral position of the limb support 401 for best ergonomic compatibility. In some embodiments, a connection element 403 can be used to connect the harness to the exoskeleton device.

Figure 5A:
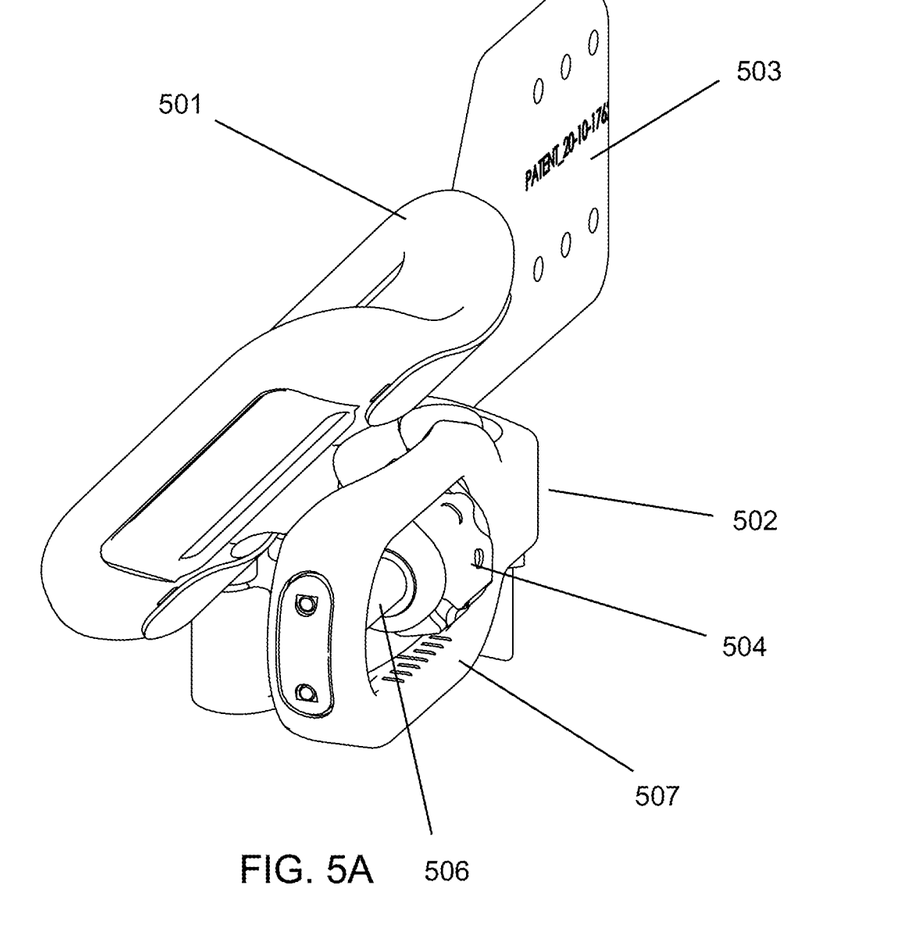
FIGS. 5A-B illustrate the rotational degree of freedom of a support of the harness as it rotates from one orientation (FIG. 5A) to another (FIG. 5B) when attached to a support holder, according to some embodiments.
Figure 5B:
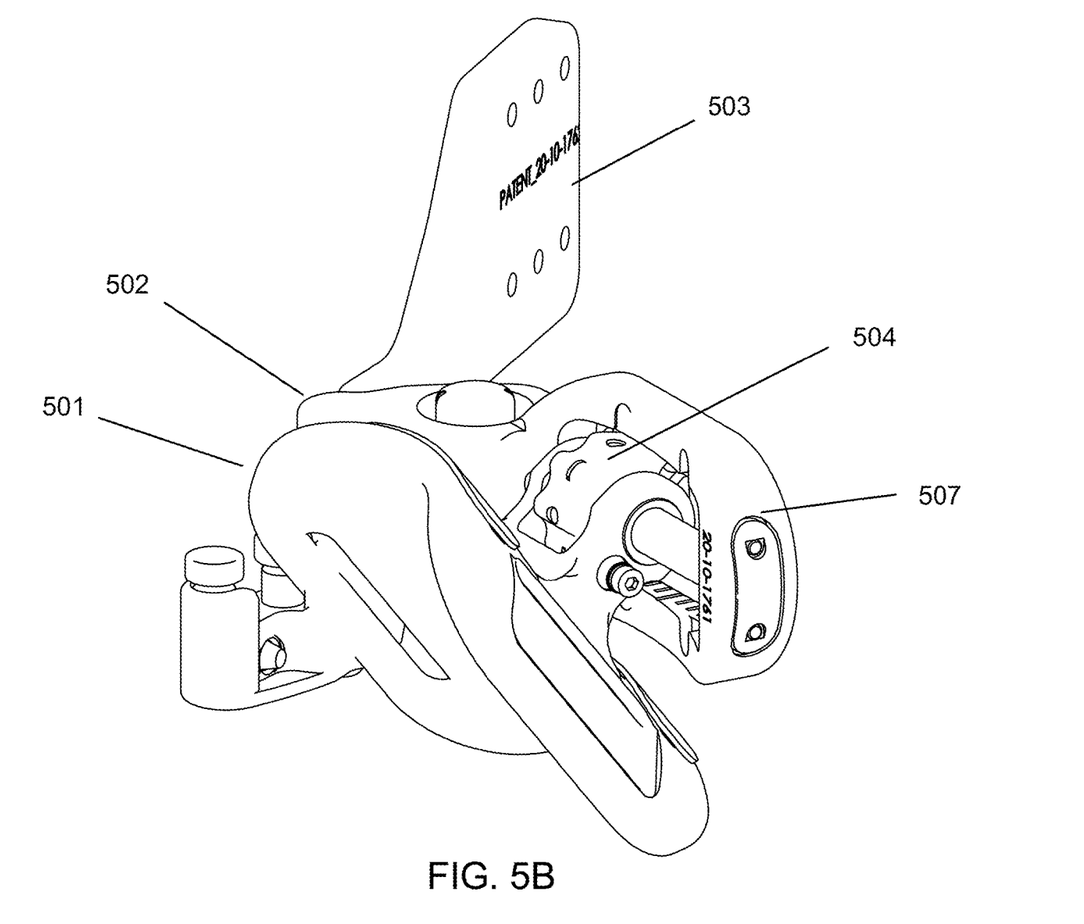

In some embodiments, with reference to FIG. 5, the support lock element 504 secured or retained by a retaining element 506 (i.e., with the retaining element 506 running through the hollow bore or conduit of the support lock element 504) may also be capable of rotating in either orientation (clockwise and anti-clockwise) about the axis parallel to the length of the retaining element 506. In some embodiments, the support lock element 504 defines lateral position of the support 501, by being mechanically attached to it. The support lock element 504 may contain an inner thread (not shown), engaged on an outer thread (not shown) made on the retaining element 506, thus allowing the support 501 to have rotational degree of freedom, but not lateral one due to, for example, engagement of the inner threads and the outer threads, which may serve to fix the limb laterally yielding stability relative to the exoskeleton device 101 while self aligning the support 501 to the limb yielding reduced pressure on it. As the support lock element 504 may be securely connected to the support 501, the rotation of the support lock element 504 about the axis parallel to the length of the retaining element 506 may also allow the support 501 to rotate about the same axis. In some embodiments, the range of rotation available for the support may be limited by the presence of the support holder 502 (e.g., the loop 507) and the distance of the support from the retaining element 506 (e.g., the shortest distance offset between the support and the loop). In some embodiments, the total range of rotation may be dependent on the offset of the support 501 from the support holder 502 as described above, and for a given offset distance, the rotation of the support 501 may range from a first angle (e.g., as measured from the axis parallel to the length of the retaining element 506) (e.g., FIG. 5A) to a second angle in a direction rotationally opposite to the first angle (e.g., FIG. 5B). In some embodiments, the values of the first angle and the second angle may be substantially equal. In some embodiments, the values may be different. For example, the first angle and/or the second angle may range from about −5° to about 5°, −4° to about 4°, −3° to about 3°, −2° to about 2°, or −1° to about 1°. The ability to rotate the support 501 in such manners can be beneficial for users of the exoskeleton device 101 as it may allow the support 501 to self orient in relation to the limb orientation. This may occur during stance or gait, during which the limbs of the user naturally collapse upon the support 501, as result of the weight of the user not being at least fully supported by the limbs of the user (e.g., paralyzed limbs unable to support body weight of user). Since the support 501 is free to rotate, at each moment, static equilibrium with the leg can only be reached as the anterior surface of the leg touches the whole surface of the support 501, top to bottom, not just one end. Thus, contact surface may be increased (e.g., maximized) and pressure on limb decreased (e.g., minimized), thereby preventing skin abrasions, pressure damage (e.g., bedsores), etc. In some embodiments, a connection element 503 can be used to connect the harness to the exoskeleton device.

As another example of connection mechanism between the support and the support holder, the locking mechanism between the support and the support holder may comprise a hook-and-eye closure, wherein the support holder may include a "hook" or an "eye" complementary to the "eye" or the "hook" of the support lock element of the support, respectively, so that the hook and the eye form a secure connection. In some embodiments, the support lock element may comprise the afore-mentioned hollow tubular body or ring, and the support holder may contain a "male" part that partially or fully occupies the hollow space or the space enclosed by the ring to securely attach the support holder to the support. In some embodiments, the lock element of the support may comprise a magnetic material, and in such embodiments, the support holder may also contain a magnetic material so as to allow the formation of a magnetic connection between the support holder and the support. In these embodiments, a retaining element may or may not be used to form or secure a connection between the support holder and the support lock element of the support.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Still further, some embodiments disclosed herein are distinguishable over prior art references by specifically lacking one or more features disclosed in the prior art; that is, claims to such embodiments may include negative limitations so as to be distinguished from the prior art.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A harness apparatus for aiding in the attachment of an exoskeleton device to a limb, comprising:
a support holder including a first end and a second end, a retaining element, and an articulation member; wherein:
the support holder is rigid;
the retaining element spans between the first end and the second end and defines a support holder axis between the first end and the second end of the support holder;
a limb support coupled to a support lock element, the limb support configured to couple and rotate about the support holder axis via the support lock element; and
a connection element configured to pivotably connect to the support holder,
wherein:
the retaining element is configured so as to anchor the support lock element along the support holder axis,
the support lock element is configured to slide along the support holder axis so as to shift a position of the limb support, and
the support lock element includes a tubular body with a hollow core configured to receive the retaining element for securing the limb support to the support holder.

2. The apparatus of claim 1, wherein at least a portion of the limb support includes a curved portion configured to correspond to a curvature of the limb.

3. The apparatus of claim 1, wherein the limb support is configured to be flexible so as to adapt to a shape of the limb when placed adjacent to the limb.

4. The apparatus of claim 1, wherein the articulation member comprises a projection for being received in a recess of the connection element.

5. The apparatus of claim 1, further including a fastener for retaining the connection element and/or the support holder at a fixed position about the common axis of rotation.

6. A harness apparatus for aiding in the attachment of an exoskeleton device to a limb, comprising:
a support holder including a first end and a second end, a retaining element, and an articulation member; wherein:
the support holder is rigid;
the retaining element spans between the first end and the second end and defines a support holder axis between the first end and the second end of the support holder;
a limb support coupled to a support lock element, the limb support configured to couple and rotate about the support holder axis via the support lock element; and
a connection element configured to pivotably connect to the support holder,
wherein
the support lock element is configured to slide along the support holder axis so as to shift a position of the limb support,
the support lock element includes a tubular body with a hollow core configured to receive the retaining element for securing the limb support to the support holder, and
the support holder is configured to receive the support lock element within a portion thereof.

7. A harness apparatus for aiding in the attachment of an exoskeleton device to a limb, comprising:
a support holder including a first end and a second end, a retaining element, and an articulation member; wherein:
the support holder is rigid;

the retaining element spans between the first end and the second end and defines a support holder axis between the first end and the second end of the support holder;

a limb support coupled to a support lock element, the limb support configured to couple and rotate about the support holder axis via the support lock element; and a connection element configured to pivotably connect to the support holder, wherein the support lock element is configured to slide along the support holder axis so as to shift a position of the limb support, the support lock element includes a tubular body with a hollow core configured to receive the retaining element for securing the limb support to the support holder, and the support holder includes a loop portion configured to receive the support lock element.

8. A harness apparatus for aiding in the attachment of an exoskeleton device to a limb, comprising:

a support holder including a first end and a second end, a retaining element, and an articulation member; wherein:

the support holder is rigid;

the retaining element spans between the first end and the second end and defines a support holder axis between the first end and the second end of the support holder;

a limb support coupled to a support lock element, the limb support configured to couple and rotate about the support holder axis via the support lock element; and a connection element configured to pivotably connect to the support holder, wherein the support lock element is configured to slide along the support holder axis so as to shift a position of the limb support, and the support lock element includes a tubular body with a hollow core configured to receive the retaining element for securing the limb support to the support holder, the support holder includes a loop portion configured to receive the support lock element; and the retaining element spans the loop portion and the hollow core of the support lock element.

* * * * *